United States Patent [19]

Nakajima et al.

[11] Patent Number: 5,147,077
[45] Date of Patent: Sep. 15, 1992

[54] STORAGE BOX COMPARTMENT MEANS FOR A MOTORCYCLE

[75] Inventors: Shinji Nakajima; Toshimasa Miyabe, both of Shizuoka, Japan

[73] Assignee: Suzuki Kabushiki Kaisha, Japan

[21] Appl. No.: 640,726

[22] Filed: Jan. 14, 1991

[30] Foreign Application Priority Data

Jan. 25, 1990 [JP] Japan .................... 2-15724
Jan. 25, 1990 [JP] Japan .................... 2-15727
Jan. 30, 1990 [JP] Japan .................... 2-17946
Feb. 5, 1990 [JP] Japan .................... 2-24344

[51] Int. Cl.$^5$ ............ B62J 7/00; B60R 7/00
[52] U.S. Cl. ............ 224/32 R; 224/42.42; 296/37.001; 296/37.1; 280/769
[58] Field of Search ............ 224/32 R, 42.42, 0.5, 224/30 R, 33 R, 33 A, 41, 42.11; 280/769, 288.4; 296/37.1; 180/89.11, 89.17

[56] References Cited

U.S. PATENT DOCUMENTS 4,522,442 6/1985 Takenaka ............ 224/42.42
4,974,765 12/1990 Marchetto et al. ............ 224/32 R Primary Examiner—Renee S. Luebke
Assistant Examiner—David J. Walczak
Attorney, Agent, or Firm—Finnegan, Henderson, Farabow, Garrett & Dunner

[57] ABSTRACT

A motorcycle includes an engine unit disposed below a main tube extending rearwardly from a head pipe and a seat detachably mounted upon a seat rail extending rearwardly from a rear end of the main tube. The motorcycle is also provided with a storage box container or compartment disposed at an upper central portion of the body frame of the motorcycle and comprising a storage box body having a rear portion supported upon the seat rail so as to be pivotable upwardly and rearwardly by a first hinge mechanism and a front portion secured to the main tube. A lid member is disposed for opening and closing the storage box body and is pivotable upwardly and forwardly by a second hinge mechanism. The storage box body has its rear portion disposed so as to be overlapped by a front end portion of the seat and is pivotable body is upwardly to a position disposed rearwardly of the first hinge so as to have a substantially upright attitude with respect to the seat rail when the seat is removed. The storage box body has a front end portion to which a front plate is mounted so as to extend forwardly therefrom, the front portion of the front plate being provided with a cut-out portion, the front plate being mounted to an upper surface portion of the front end of the main tube which is disposed close to a connecting portion defined between the main tube and the head pipe so that the cut-out portion surrounds a rear surface portion of the head pipe.

20 Claims, 12 Drawing Sheets

STORAGE BOX COMPARTMENT MEANS FOR A MOTORCYCLE

CROSS-REFERENCES TO RELATED APPLICATIONS

The present patent application is directed toward technology which is related to similar technology disclosed within U.S. patent application Ser. Nos. 643,724 and 644,263 which are co-pending herewith.

FIELD OF THE INVENTION

The present invention relates to a storage box compartment of a motorcycle, and particularly includes an improved arrangement of members in association with the storage box compartment.

BACKGROUND OF THE INVENTION

Generally, a motorcycle is provided with an engine unit mounted below a main tube extending backwardly from a head pipe, and a seat mounted upon a seat rail extending backwardly still further from the back end of the main tube. In the instance that a storage box compartment is required for storing a large commodity such as, for example, a helmet, it is possible to adopt an arrangement, such as, for example, by mounting the storage box upon the main tube and shifting the fuel tank to another location such as, for example, below the seat.

On the other hand, when maintenance is to be carried out for the engine unit and auxiliary machinery is arranged around it, the storage box tends to become an obstacle. More particularly, every time maintenance is to be carried out, it is necessary to dismount the storage box. The foregoing is especially true in the case of motorcycles which are comparatively large in size and in many cases provided with cowlings extending from the front portion of the engine unit to the opposite sides thereof, whereby the frequency dismounting of the storage box becomes high. Accordingly, it is required that the storage container box can be readily mounted and dismounted with respect to the motorcycle framework.

However, it is necessary to design the storage box so as not to be readily dismounted by means of an unauthorized person because the interior of the storage box is mainly used for personal matter or for storing things which are important and expensive.

It is also necessary for the storage box attaching device to be easily visible and readily accessible and operable so as not to provide an aesthetically poor outer appearance thereof.

In a related aspect, in the prior technology, since the rear wheel is disposed below the seat, the motorcycle is very compact with respect to available space. Therefore, there is a problem that, in connection with a fuel tank which is capable of having a sufficient capacity, it is difficult to define a configuration and an attaching device as well so as to dispose a fuel supply port and a fuel supply cock which are readily accessible and operative. The fuel tank is required to be provided with a reserve device comprising a reservoir tank and a cock for the changeover of the fuel, or a precaution device providing a reserve liquid level caution indicator, light, alarm, or the like for preventing the shortage or complete depletion of fuel. It is, however, ideal to provide a fuel gauge enabling the driver or operator to monitor the amount of stored fuel.

However, although it is possible to readily provide a fuel shortage prevention or monitoring means for the peculiarly configured fuel tank as mentioned above, it is mechanically as well as electrically difficult to manufacture and attach such a fuel gauge which is capable of continuously indicating the fuel storage condition between a full tank state and an empty state (F←→E). Furthermore, it is virtually impossible to observe the liquid surface of the fuel through the fuel supply port after removal of the cap. Accordingly, since it is impossible for the driver to know how much fuel still remains within the fuel tank, such condition results in severe anxiety to the driver.

OBJECTS OF THE INVENTION

A primary object of the present invention is to substantially eliminate the defects or drawbacks encountered within the prior art as described above and to provide a storage box compartment or container for a motorcycle which is capable of facilitating the mounting and dismounting of the storage box compartment or container upon the motorcycle framework, which is convenient for maintenance of the motorcycle engine unit, and which is able to be firmly secured upon the motorcycle at the attached portion of the motorcycle during normal usage of the motorcycle.

Another object of the present invention is to provide a storage box compartment or container which is a capable of providing a good outer appearance which is conformable to the overall exterior configuration of the motorcycle.

A further object of the present invention is to provide a storage box container or compartment in association with an improved arrangement of the fuel tank which is provided with a fuel gauge means by utilizing a small amount of dead space.

SUMMARY OF THE INVENTION

These and other objects can be achieved according to the present invention, in accordance with one aspect thereof, by providing a a storage box container or compartment a motorcycle including an engine unit which is disposed at substantially a central portion of the motorcycle body and below a main tube extending rearwardly thereof, this is, backwardly, from a head pipe thereof, and including a seat detachably mounted upon a seat rail extending rearwardly still further from the rear end of the main tube, the storage box container or compartment being disposed at substantially an upper central portion of the body frame of the motorcycle and comprising a storage box body having an upper opening and having a rear portion supported upon the seat rail so as to be upwardly swingable by a first hinge means, and a front portion secured to the main tube, a lid member for opening and closing the opening of the storage box body so as to be upwardly swingable by a second hinge means, and a lock means mounted upon the storage box body for locking the lid member, the rear portion of the storage box body being disposed so as to be overlapped by means of a front end portion of a lower surface portion of the seat which is provided with a seat lock. The first hinge means is disposed at the rear end portion of the storage box body and the storage box body is upwardly swingable to a position which is disposed rearwardly of the first hinge means so as to have a substantially upright attitude with respect to the seat rail when the seat is removed.

In accordance with another aspect of the present invention, there is provided a storage box container or compartment a motorcycle which includes an engine unit disposed at a substantially central portion of the motorcycle body and below a main tube extending rearwardly from a head pipe and further including a seat detachably mounted upon a seat rail extending rearwardly still further from the rear end of the main tube, the storage box container or compartment being disposed at substantially an upper central portion of the body frame of the motorcycle and comprising a storage box body having an upper opening and having a rear portion supported upon the seat rail so as to be upwardly swingable by a first hinge means, a lid member for opening and closing the opening of the storage box body being upwardly swingable by a second hinge means, and a lock means mounted upon the storage box body for locking the lid member, the storage box body having a front end portion to which a front plate, having a front portion extending forwardly from the front end portion of the storage box body, is secured, the front portion of the front plate being provided with a cut-out portion, the front plate being mounted upon an upper surface of a front end portion of the main tube close to a connecting portion of the front plate and the head pipe so that the cut-out portion of the front plate surrounds a rear surface of the head pipe. The cut-out portion of the front plate has a substantially semi-circular shape so as to conceal a welding portion defined between the head pipe and the main tube.

According to the characteristics of the present invention as described above, it becomes possible to remove the seat by unlocking the seat lock so as to release the front end portion thereof, and to swing the storage box body backwardly and upwardly by means of the hinge, so that the engine unit can be rendered accessible at the upper portion thereof so as to facilitate maintenance working operations thereof.

After the completion of the maintenance operations, since the storage box body can be correctly positioned upon the main tube merely by being swung downly, it becomes unnecessary to adjust the positioning thereof every time maintenance is to be performed, so that the front end thereof can be quickly fixedly secured so as to facilitate the attachment thereof. In this way, since the storage box body can be easily handled or manipulated by merely being swung upwardly and moved downwardly, the workability of mounting and dismounting the same can be remarkably improved in comparison with such an operation wherein it is required to hold the storage body in an upward position or to move and the same to another location. During the performance of the maintenance operations, since the posture of the storage box body when opened backwardly and upwardly is stable because of the same upon the upright attitude on the seat rail, it is unnecessary to pay further attention to this matter and it becomes possible to concentrate upon the maintenance work.

Furthermore, since the storage box body is normally unable to be swung or pivoted even though the front portion thereof is disassembled because it is being pressed upon by means of the seat to which the seat lock is applied, it is possible to prevent a thief from taking it away by diassembling the hinge mechanism.

In accordance with another aspect of the present invention it becomes possible to swing the storage box body backwardly and upwardly, through means of the hinge mechanism, by releasing the front plate mounted upon the front portion thereof, so that the engine unit can be rendered accessible at its upper portion so as to facilitate the maintenance operations for the engine unit and the auxiliary components thereof.

After the completion of the maintenance operations, since the storage box body can be correctly positioned upon the main tube by merely lowering the same, the front plate disposed upon its front end can be readily and fixedly secured so as to facilitate its attachment.

Since the configuration of the front plate is predetermined in accordance with the connection portion defined between the head pipe and the main tube, the welding bead formed at this connection portion can be concealed so as to provide the body of the motorcycle with a good or pleasing outer appearance.

BRIEF DESCRIPTION OF THE DRAWINGS

For a better understanding of the present invention and to show how the same is carried out, reference is made, by way of preferred embodiments, to the accompanying drawings, in which like reference characters are used to designate like or corresponding parts throughout the several views, and wherein.

DESCRIPTION OF THE PREFERRED EMBODIMENTS

Figure 1:
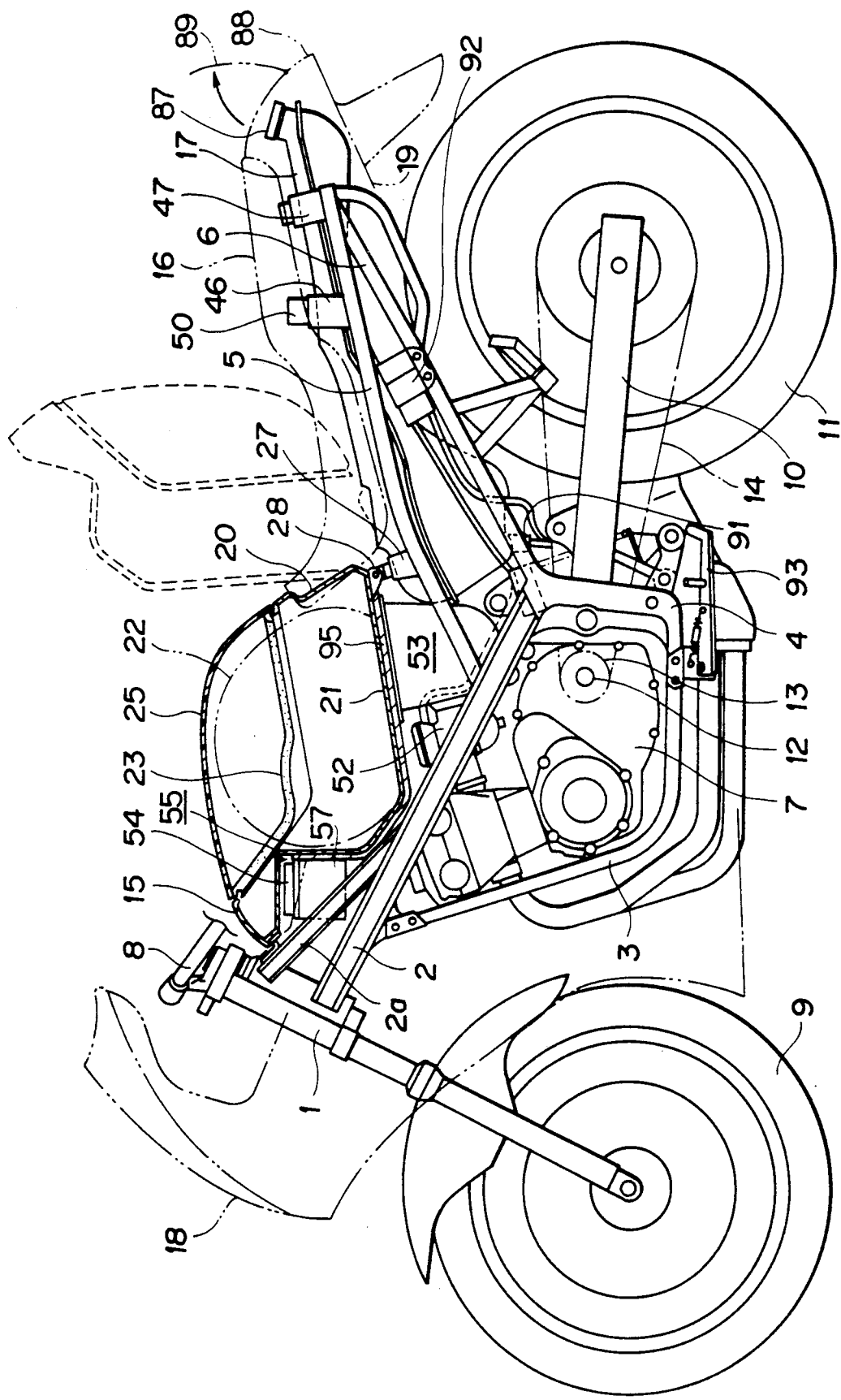
FIG. 1 is a vertical side view, partially in section, of a motorcycle provided with a storage box container or compartment constructed according to the present invention.
Figure 2:
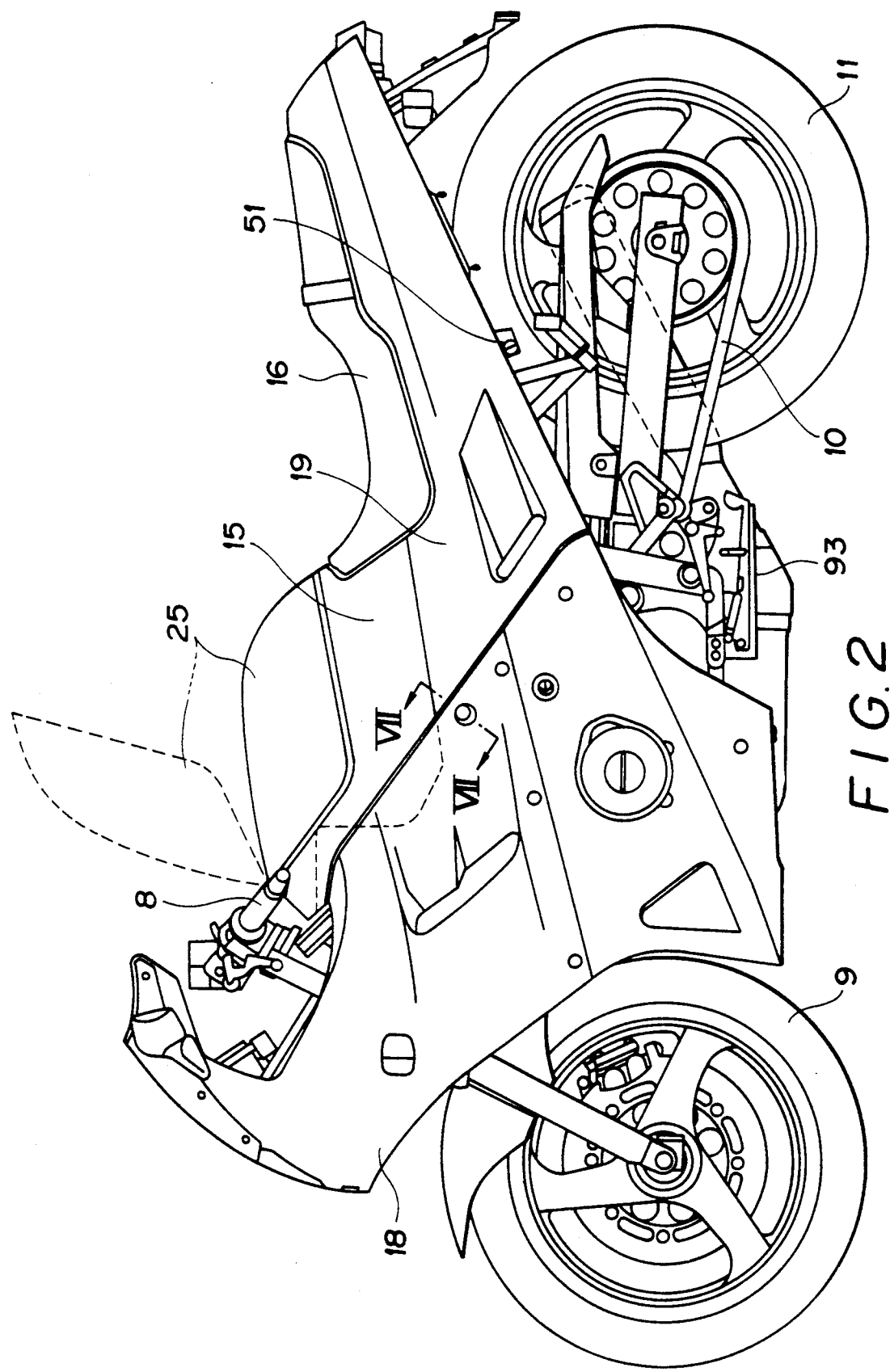
FIG. 2 is a side view of the motorcycle of FIG. 1 showing the outer appearance thereof.
Figure 3:
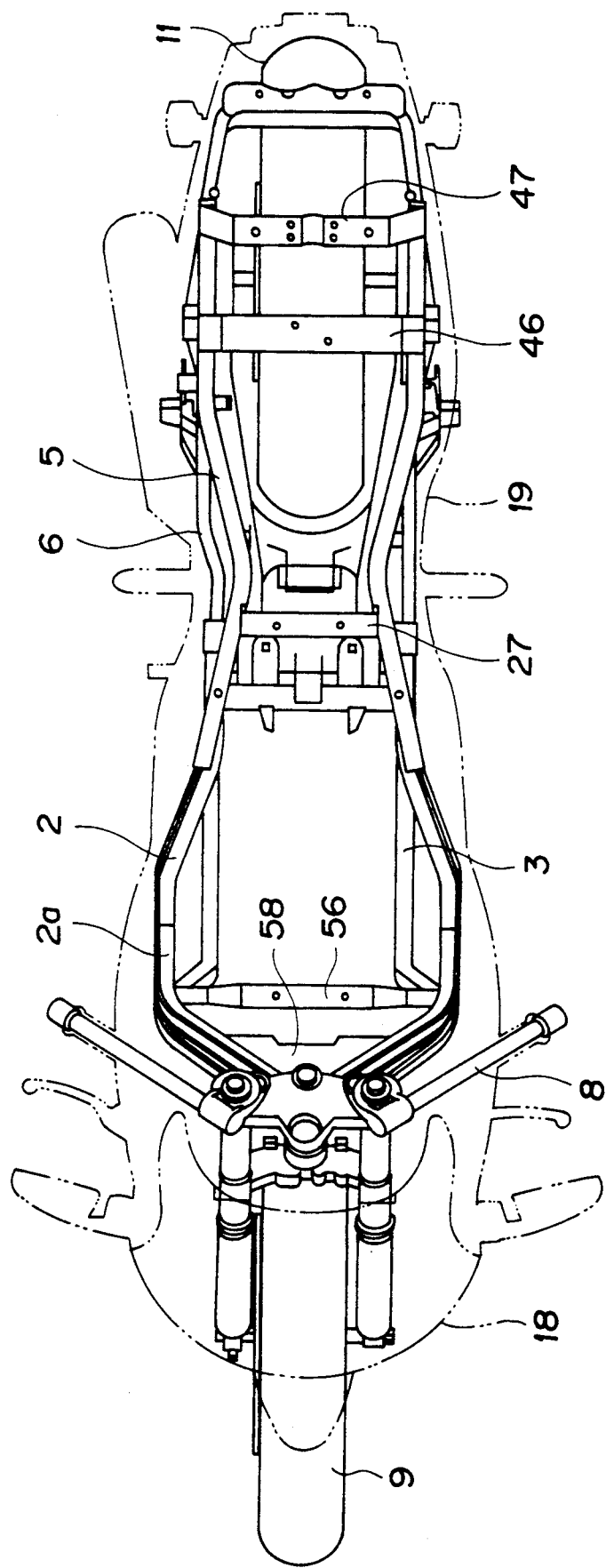
FIG. 3 is a plan view of the motorcycle showing the frame construction thereof.

Referring to FIGS. 1 to 3, the frame of the motorcycle comprises left and right paired main tubes 2 extending backwardly and downwardly in an inclined manner from a head pipe 1, left and right down tubes 3 extending vertically downwardly and then backwardly, left and right seat rails 5 for supporting a seat 16, left and right central pillars 4 connected to the rear ends of the seat rails 5 and also connected to the back end portions of the main tubes 2 so as to extend backwardly and upwardly in a inclined manner, and a pair of body tubes 6 connected to the rear ends of the seat rails 5 so as to support the rear ends of the seat rails 5.

Within the framework described above and disposed at the central portion thereof, an engine unit 7 is mounted. A front wheel 9 adapted to be manuevered by means of a handle bar is rotatably supported by means of the head pipe 1, and a rear wheel 11 is rotatably supported by means of rear ends of swingable arms 10 pivotably mounted upon the central pillars 4. The rear wheel 11 is adapted to be driven by means of drive sprocket gear 13 fixedly secured to an output shaft 12 of the engine unit 7 through means of a chain 14.

A storage box 15 is disposed above the region extending from the main tubes 2 to the front portion of the seat rails 5, and a tandem seat 16 serving also as a pillion seat is disposed upon the back portion of the seat rails 5. Due to this location of the storage box 15, a fuel tank 17 is disposed within the space surrounded by means of the seat rails 5 and the body tubes 6 and beneath the seat 16.

The opposite sides of the motorcycle and extending from the front of the engine unit 7 and below the storage box 15 to the region disposed above the front wheel 9 are covered by means of cowlings 18, and continuously therewith, the opposite sides of the motorcycle and extending from fuel tank 17 below the lower edges of the seat 16 to the cowlings 18 are covered by means of body covers 19.

Figure 4:
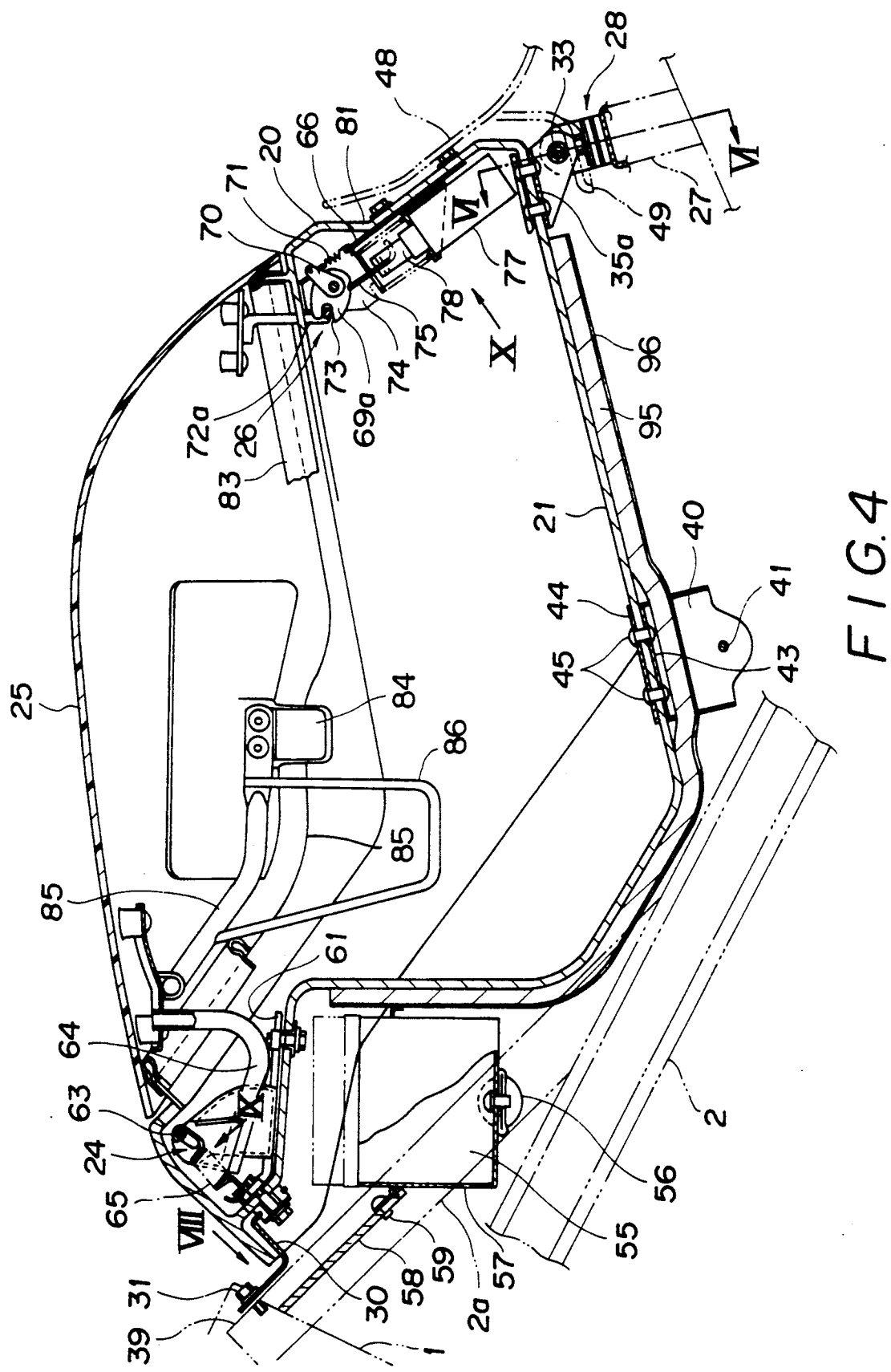
FIG. 4 is a vertical side view in section of the storage box container or compartment, upon an enlarged scale, of the motorcycle of FIG. 1.
Figure 5:
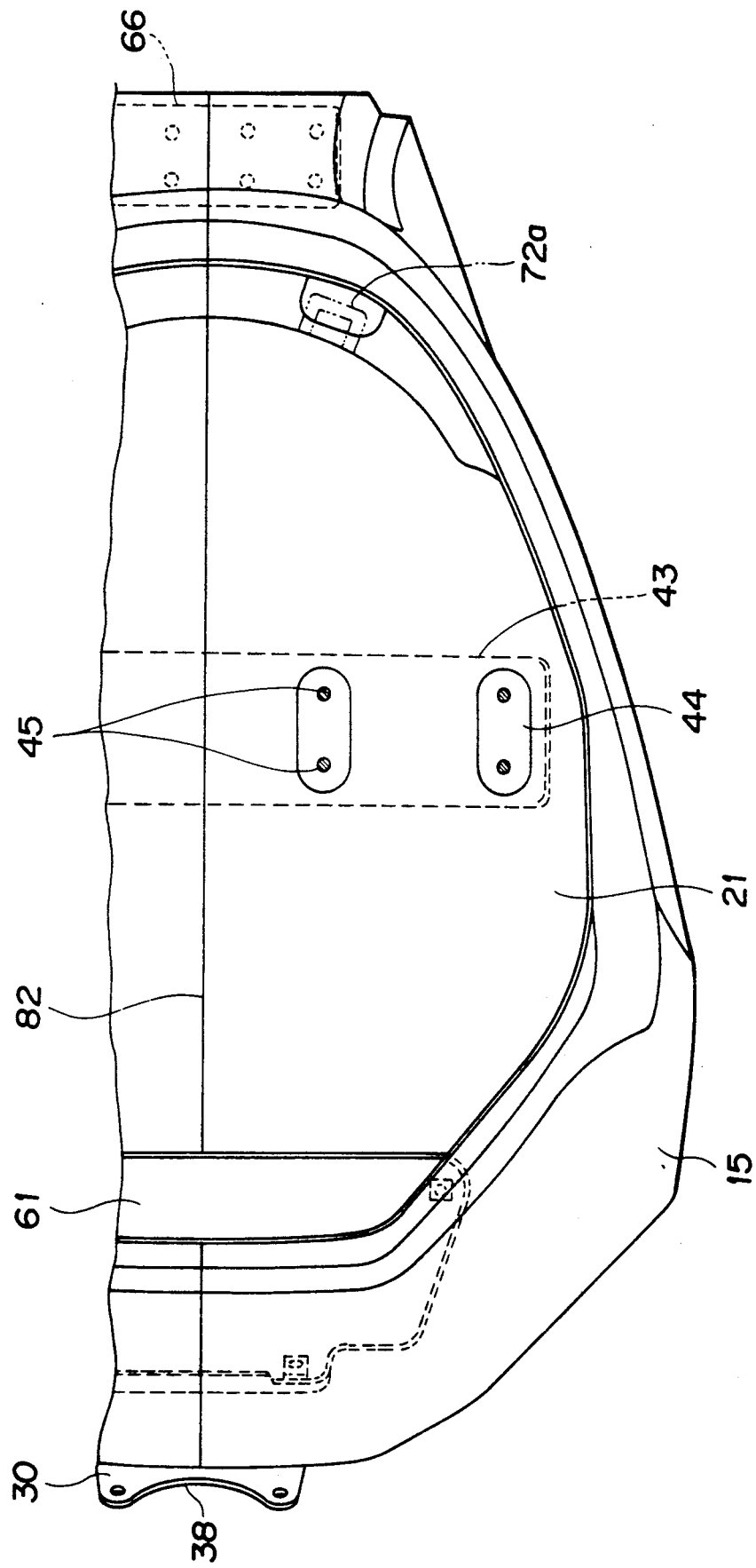
FIG. 5 is a plan view of a portion of the storage box container or compartment with the lid removed.

Referring, in addition, to FIGS. 4 and 5, the aforementioned main tubes 2 are connected to a lower portion of the head pipe 1. Reinforcement upper main tubes 2a are connected to an upper portion of the head pipe 1 the central rear side thereof. Both of these tubes 2, 2a diverge laterally outwardly from the head pipe 1, and then converge backwardly toward the longitudinal axis of the motor cycle so as to be connected to the leading end portions of the seat rails 5.

The aforementioned convergencies extend from the front end portions through the quarter front portions of the seat 16, and then they gradually diverge toward the central portions of the seat such that their back-halves extend backwardly so as to be disposed substantially parallel with respect to each other.

The storage box 15 presents a substantially egg-like configuration comprising a round front end and a narrowing back portion in plan view so as to be disposed along the upper main tubes 2a and the seat rails 5 and presents a substantially parallelogram configuration comprising a front-half forward edge portion extending along the upper main tubes 2a and a back wall portion 20 inclined backwardly and downwardly in parallel relationship with respect thereto as viewed from the side view.

The storage container box 15 is provided with a bottom plate 21 and has a volume which is sufficient for storing a full-face helmet 22, the box 15 having an opening 23 defined within the upper surface so as to enable one to insert the helmet therein and remove the same therefrom. The opening 23 is covered by means of a lid 25 which is capable of being opened and closed at its front end in the forward and upward direction through means of a hinge mechanism 24. The lid 25 is adapted to be locked at its closed position by means of a lock mechanism 26.

The storage container box 15 is fixedly secured as follows. More particularly, a pedestal plate 27 is bridged over the left and right seat rails 5 at the narrowest portion thereof. The storage container box 15 is pivotable backwardly and is supported at its back end lower surface by means of the pedestal plate 27 through means of a hinge mechanism 28, and a front plate 30 is attached to the front end lower surface thereof through means of cushion so as to extend forwardly so as to be fixed to the front end of the upper main tubes 2a by means of bolts 31.

Figure 6:
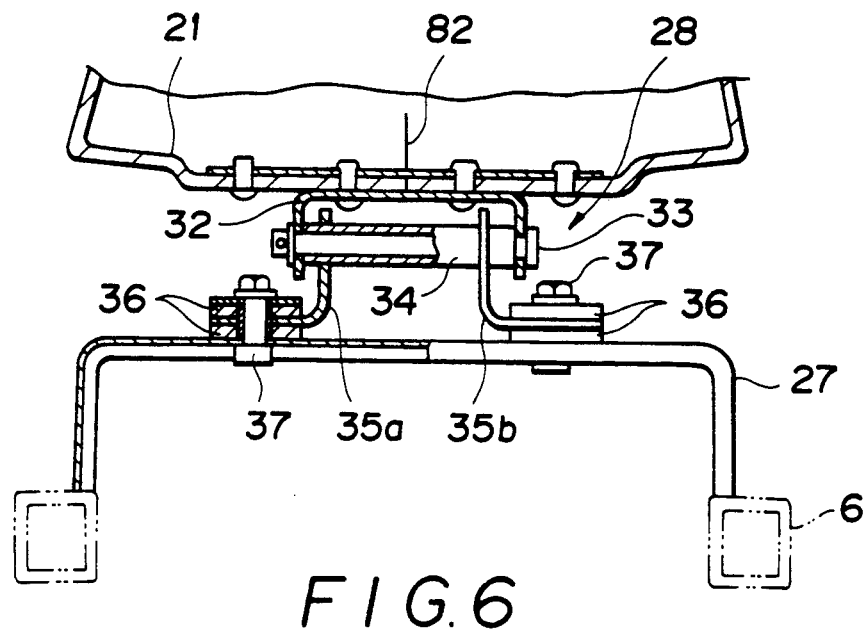
FIG. 6 is an enlarged sectional view taken along the line 6—6 in FIG. 4.

As shown in FIG. 6, the hinge mechanism 28 comprises a bearing bracket 32 which is riveted to the back end lower surface of the bottom plate 21 of the storage box, a pivot pin 33 held within opposite ends of bracket 32, and attachment brackets 35a, 35b which are welded to the opposite end portions of a pipe 34 and are attached to the pedestal plate 27 by means of bolts 37 through means of cushions 36, the pivot pins 33 and the pipe 34 being coaxially connected to each other.

Figure 8:
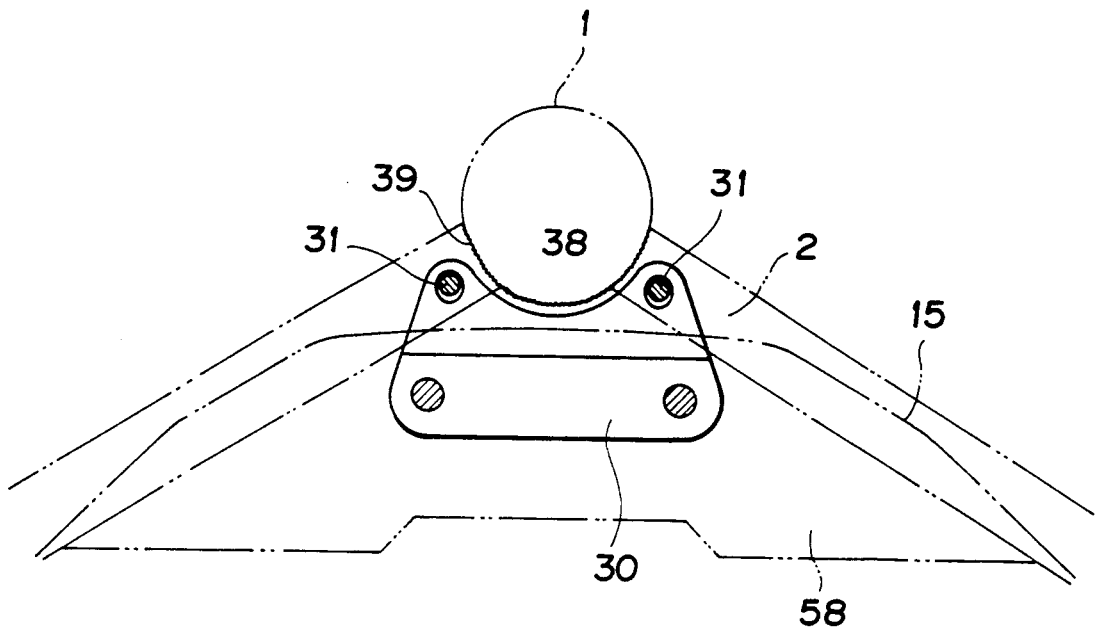
FIG. 8 is an enlarged plan view as viewed in the direction of arrow A in FIG. 4.

As shown in FIG. 8, the front plate 30 has a semi-circular cut-out portion 38 formed within the front edge region thereof, it is disposed within a plane disposed parallel to the upper surfaces of the upper main tubes 2a and is so arranged as to be disposed near the connection point of the head pipe 1 and the upper main tubes 2a so as to surround the rear surface of the head pipe 1 by means of the cut-out portion 38 when the plate 30 is attached to the tubes 2a. Therefore, the welding bead line 39 provided at the connection portion defined between the head pipe 1 and each upper main tube 2a can be concealed.

Figure 7:
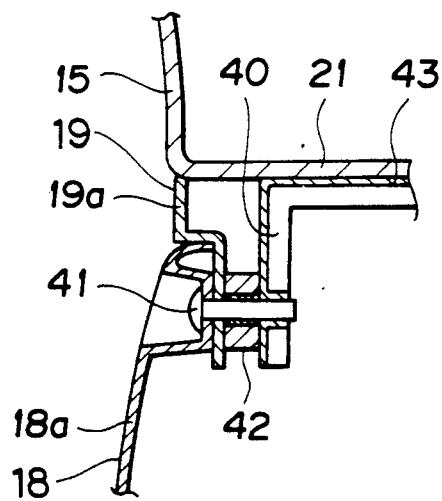
FIG. 7 is an enlarged sectional view taken along the line 7—7 in FIG. 2.

Furthermore, upon the opposite sides of the storage container box 15 at substantially the longitudinally central portions thereof, there are provided side attachment brackets 40 which extend downwardly and, as shown in FIG. 7, which are connected by means of ornamental machine screws 41 through means of a cushion 42 to connection edge portions 18a, 19a to which both the aforementioned cowlings 18 and the body covers 19 are superimposed upon and attached to each other. The left and right side attachment brackets 40 are integrally connected to each other by means of a base 43. The base 43 is fixedly secured to the bottom plate 21 along the lower surface of the bottom plate 21, together with liners 44 placed upon the upper surfaces thereof, by means of rivets 45, as is also seen from FIG. 5. of the cycle being disclosed in FIG. 1.

Continuing further, upon the back portions of the seat rails 5 there are provided seat placement plates 46, 47 which are laid across the motorcycle in the left and right or transverse directions and the seat 16 is placed thereon as best seen from FIGS. 1 and 3. In this case, as shown in FIG. 4, they are so arranged that the seat bottom plate front end portions 48 are disposed in a forwardly and upwardly inclined manner and are superimposed onto the back wall 20 of the storage box 15 which is disposed adjacent thereto.

The seat 16 is fixedly secured by means of a conventional mechanism in which insertion brackets 49 projecting forwardly from the aforementioned seat bottom plate front end portions 48, as best seen in FIG. 4, are inserted into insertion holes of the aforementioned pedestal plates 27 so as to actuate a seat lock 50 disposed upon the seat placement plates 46 as seen in FIG. 1. Accordingly, under this fixedly secured condition, the pivotal movement of the storage container box 15 is prevented by means of the front end portions 48 of the seat bottom plate. The seat lock 50 is adapted to be released by means of a key cylinder lock 51 disposed within the lower portion of the body cover 19, as best seen in FIG. 2, and a key.

By removing the aforementioned front plate 30 and the side attachment brackets 40 after removal of the seat 16 by unlocking the seat lock 50, it becomes possible to pivot or swing the storage box 15 in a upwardly and backwardly manner by means of the hinge mechanism 28. The swing or pivotable movement angle is approximately 90 degrees or more, and the relative locations of the respective components of the container 15 and the support system thereof are so set that the major part of the storage box 15 can be disposed behind the axis of the pivot 33 of the hinge mechanism 28 and can be disposed upright above the upper surface of the fuel tank 17.

In this way, by swinging the storage box 15 backwardly and upwardly, the upper portion of the engine unit 7 can be uncovered and rendered accessible, so that it becomes easy to maintain and inspect each portion of the engine and the auxiliary components. For example, it becomes easy to carry out maintenance work such as, for example, an adjustment of the carburetor 52, replacement of a filter for the air cleaner 53, or the addition of battery liquid to a battery 54 disposed near the air cleaner 53, these various components of the cycle being disclosed in FIG. 1.

After the maintenance operations have been completed, the storage box 15 is correctly positioned by merely lowering the same so that it becomes unnecessary to adjust it every time it is repositioned, and accordingly the front plate 30 at its front edge portion can be secured to the upper main tubes 2a so as to facilitate the attachment operation thereof.

At the time of performance of the maintenance operations, since the posture of the opened storage box 15 is stable and upright with the same disposed upon the seat rails 5 as noted heretofore, the hands of the maintenance worker are no longer required to be occupied whereby undivided attention may be addressed to the maintenance operations.

Furthermore, since the storage box 15 is pressed downwardly by means of the seat 16 to which, in turn, is locked by means of the seat lock, and is adapted to be prevented from being pivoted upwardly and backwardly through means of though the front plate 30 which is normally fixed to the upper main tubes 2a, it is possible to prevent a theft of the stored commodity by disassembly of the hinge mechanism 28.

In addition, since the shape of the front plate 30 is so defined as to be disposed along the connection portion defined between the head pipe and the main tubes, the welding bead formed at the connection portion can be concealed so as to provide a good outer appearance to the motorcycle.

The front end portion of the bottom plate 21 of the storage container box 15 is formed with a concave chamber or recessed portion 55. The battery 54 is held within a battery holder 57 disposed upon a flat bridge tube 56 laid across the front end portions of the upper main tubes 2a and consequently, the battery can be accommodated within the aforementioned concave chamber or recessed portion 55 without any interference with other components of the motorcycle.

Furthermore, a triangular reinforcement plate 58 is welded to the front ends of the upper main tubes 2a and the head pipe 1, as best seen in FIG. 3, and a portion of the aforementioned battery holder 57 is secured to the upper surface of the reinforcement plate 58 by means of bolts 59, as is also seen in FIG. 4.

Figure 9:
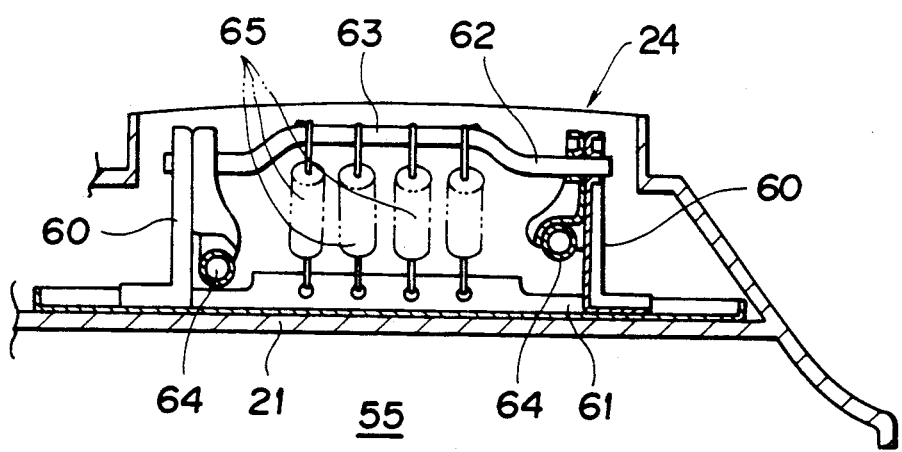
FIG. 9 is an enlarged rear view as viewed in the direction of arrow B in FIG. 4.

The hinge mechanism 24 of the aforementioned lid 25, as shown in FIG. 9, comprises a base plate 61, provided with bearings 60 at opposite sides thereof, disposed upon a front end portion of the bottom plate 21, that is, upon the upper horizontal wall of the plate 21 defining the concave chamber recessed portion 55 so as to rotatably support a pivot rod 62 of the lid 25. Since the pivot rod 62 is provided with a crank-like eccentric portion 63 and is fixedly secured to the front ends of left and right pivotable levers 64 extending forwardly from the front end of the lid 25, a plurality of coil springs 65 are resiliently mounted in parallel relationship between the eccentric portion 63 of the pivot rod 62 and the base plate 61 so as to bias the lid 25 toward its closed and opened positions.

More particularly, the relationship defined between the force of the aforementioned coil springs 65 and the eccentric portion 63 is so set that the force acts mainly in the opening direction of the lid 25 and reverses in the closing direction thereof over a neutral point within a small angular range of the opening or closing operation.

In this manner, the hinge mechanism 24 is constructed compactly and effectively operates during the opening and closing of the lid 25. Since it is small in dimension, the effective capacity of the storage box 15 is not affected thereby.

Figure 10:
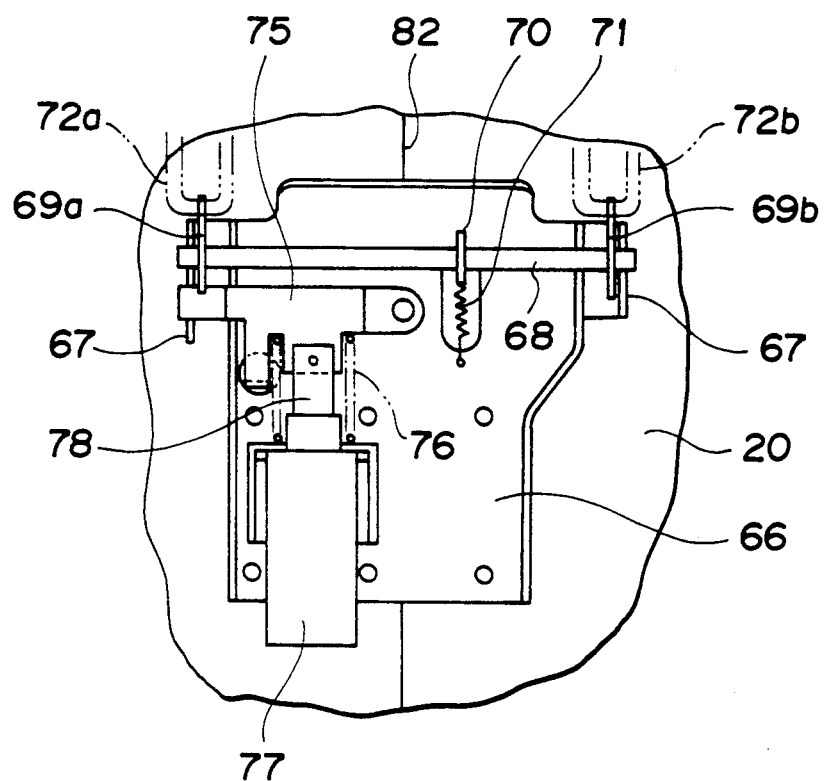
FIG. 10 is an enlarged front view as viewed in the direction of arrow C in FIG. 4.

On the other hand, the lock mechanism 26 of the lid 25, as generally indicated in FIG. 4 and as more particularly shown in FIG. 10, is attached to a base plate 66 mounted upon the inner surface of the back wall 20 of the storage box 15.

Bearings 67 are provided upon the left and right upper portions of the base plate 66 so that a striker shaft 68 can be rotatably supported thereby. Left and right strikers 69a, 69b are fixedly secured to the opposite ends of the striker shaft 68. A spring 71 is connected between the base plate 66 and a lever 70 fixedly secured to the striker shaft 68 so as to always resiliently bias the strikers 69a, 69b in the release direction.

Left and right paired hooks 72a, 72b are provided upon the rear end inner surface portion of the lid 25. When the lid 25 is disposed over the opening 23 of the storage box 15 and moved from its opened position toward its closed position, the leading ends of the hooks 72a and 72b are engaged within radial grooves 73 defined within the strikers 69a and 69b and serves to rotate the strikers 69a, 69b toward the locked direction.

One striker 69a is provided at an external peripheral portion thereof with a cam face having a stepped portion 74, with an external peripheral portion thereof having an engagement lever 75 resiliently brought into contact therewith by means of a spring 76. As mentioned above, when the strikers 69a, 69b are rotated toward the locked direction, the engagement lever 75 is engaged with the stepped portion 74 of the striker 69a for preventing it from reversing in the release direction. It is therefore impossible for the hooks 72a, 72b to be released, and therefore it is seen that the lock mechanism 26 is effectively operable.

The engagement lever 75 is operatively connected to a movable magnetic core 78 of a solenoid device 77. The movable magnetic core 78 pulls the engagement lever 75 against the biasing force of the spring 76 when electricity is supplied to the solenoid device 77, so that the strikers 69a, 69b are released whereby, in turn, the lock mechanism 26 is released.

Figure 13:
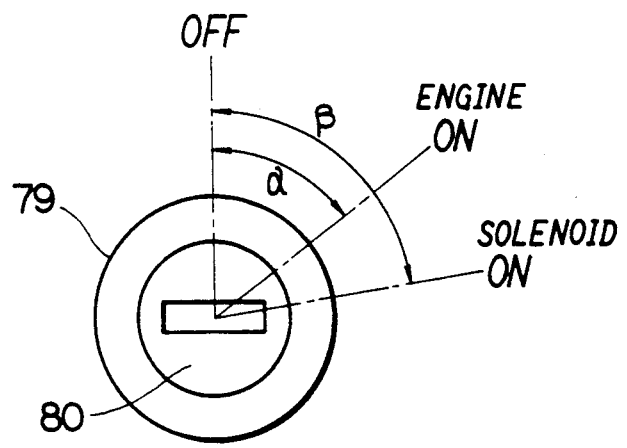
FIG. 13 is an explanatory diagram of a switch means of the engine unit of the motorcycle.

As shown in FIG. 13, a switch for supplying the electricity to the solenoid 77 is interlocked with an engine switch 79. The engine becomes condition operational condition when a cylinder lock 80 is turned through means of a predetermined turning angle α by means of a key inserted within the engine switch mechanism 79. When the cylinder lock 80 is turned still further through means of a predetermined turning angle β, the electricity is supplied to the solenoid device 77. In addition, when the lock 80 is turned through means of an angular movement corresponding to the position of the angle β, the engine is operational. The cylinder lock 80 is adapted to be automatically returned from the position of the angle β to the position of the angle α position by means of a spring, whereby the lid 25 can be opened regardless of the engine operation or the termination of the engine operation.

In order to counteract the estate or condition if and when the solenoid device 77 becomes unworkable due to, for example, an accident or malfunction of the electric system, there is provided a through-hole 81 formed within the back wall 20 of the storage box 15 at a position behind the solenoid device 77. By inserting a screwdriver or other similar tool into the through-hole 81 so as to push the movable magnetic core 78 downwardly, the lock mechanism 26 can be manually released.

The through-hole 81 is covered by means of the front portion 48 of the seat 16, as best seen in FIG. 4, to the external surface of which the seat lock is applied as mentioned above. Accordingly, persons other than the one who is authorized to release the seat lock 50 are prevented from performing the manual release of the seat without the proper authorization.

In this manner, the lock mechanism 26 of the lid 25 is compact and can be accommodated within the storage box 15 in a space saving manner in a similar mode to that of accommodating the hinge mechanism 24. Since the hooks 72a, 72b are arranged in the left and right paired state together with the strikers 69a, 69b, the mounted posture of the lid 25 is not deformed and is balanced. It is possible to make the lid 25 thinner. Since the lock mechanism 26 is arranged along the back wall 20 of the storage box 15, it is possible to provide a safe manual releasing device.

In a preferred embodiment, the storage box body 15 is made of a resin material and is constructed so as to be bilaterally divisible into two body halves which are connected together so as to form a unitary storage box by means of welding, for example, as understood by means of the connection line 82 shown in FIGS. 5, 6 and 10. Therefore, it can be manufactured more efficiently than as a one-piece formation. Furthermore, as mentioned above, since the bearing bracket 32 of the hinge mechanism 28, the front plate 30, the base plate 43 of the side attachment brackets 40, the base plate 61 of the hinge mechanism 24, and the base plate 66 of the lock mechanism 26 are connected to the storage box 15 in such a state that such components span both halves of the box 15, the box halves are connected together in an extremely strong and stable manner.

Accordingly, the storage box 15 can be made thinner with respect to its wall thickness as well as can be rendered low in welding rigidity and weight.

Figure 11:
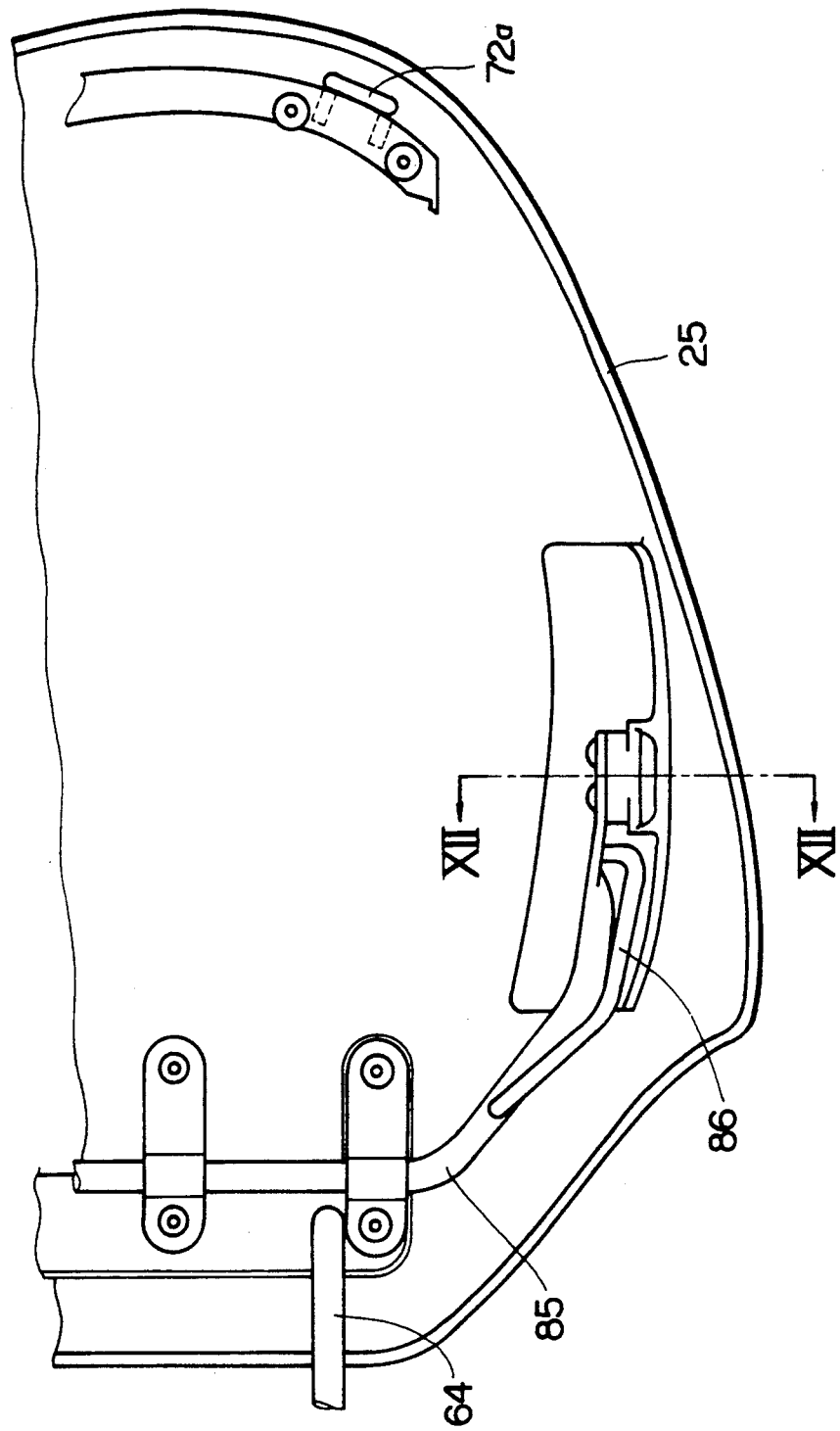
FIG. 11 is a bottom plan view of a portion of the lid of the storage box container or compartment shown in FIG. 4.
Figure 12:
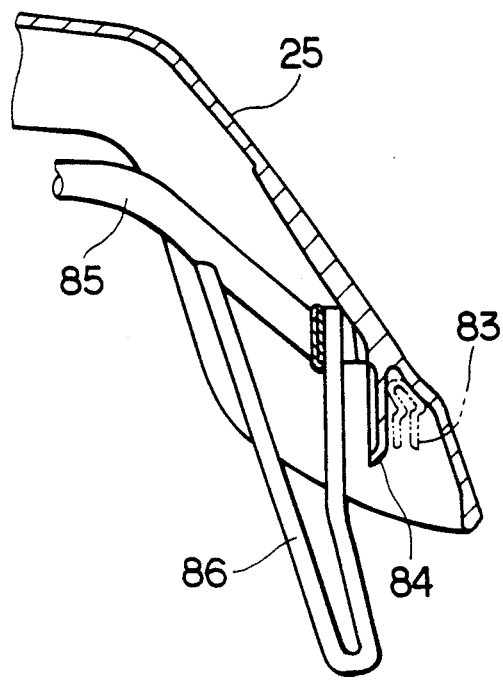
FIG. 12 is a sectional view taken along the line 12—12 in FIG. 11.

As shown in FIGS. 11 and 12, the lid 25 is provided with a deformation prevention device.

The lid 25 is so mounted upon the storage box 15 that the inner surface of its peripheral edge portion is brought into contact with a seal 83 provided upon the upper peripheral surface of the box 15 which defines the opening 23 of the storage box body 15. Tongue pieces 84 integrally formed from the material of the lid 25 extend downwardly from the opposite side portions of the inner surface of the lid 25 so as to extend away from the inner surface thereof, and there are also provided tube-made reinforcement ribs 86 which likewise extend downwardly from a the pipe 85 which is fixedly secured to the inner peripheral surface of the lid 25 so as to likewise extend away from the inner surface of the lid 25.

These tongue pieces 84 and reinforcement ribs 86 are disposed radially inwardly of the aforementioned seal 83 when lid 25 is closed, whereby the peripheral edge of the opening 23 is interposed between the inner and outer portions of the lid 25 so as to prevent deformation of the lid 25. Such deformation prevention means is especially effective in connection with an attempted theft of a stored commodity from the storage box 15 wherein the opposite side portions of the peripheral edge of the lid 25 are attempted to be forcedly spread apart or separation from the storage box 15.

Figure 14:
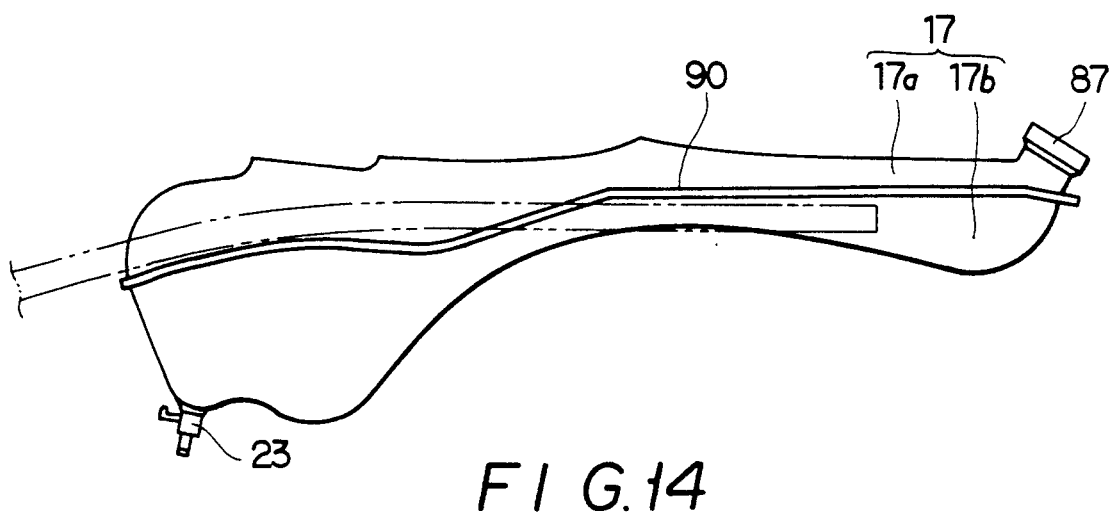
FIG. 14 is an enlarged side view of the fuel tank shown in FIG. 1.
Figure 15:
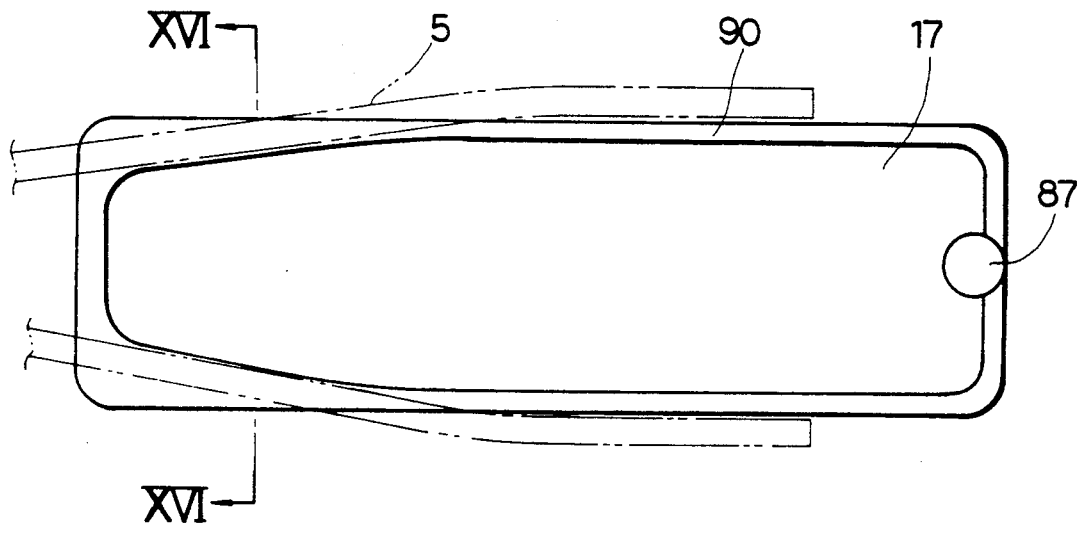
FIG. 15 is an enlarged plan view of the fuel tank shown in FIG. 1.
Figure 16:
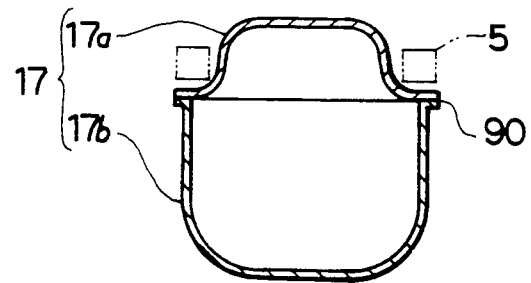
FIG. 16 is a sectional view taken along the line 16—16 in FIG. 15.

Next, as shown in FIGS. 14, 15 and 16, the fuel tank 17 is so formed as to be accommodated between the body covers 19 and below the seat 16. The fuel tank 17 extends substantially parallel to the seat rails 5 and has its bottom surface disposed above the upper portion of the rear wheel 11. The tank 17 is somewhat inclined so as to be disposed higher at the rear end and has both its thickest portion and lowest portion formed at the front end thereof as well as its thinnest portion provided at the rear end portion thereof. The rear end portion thereof is disposed within a tail cover 88, and a fuel supply port 87 is provided within the upper surface thereof. After an openable and closable lid 89 provided within the tail cover 88 has been opened, it becomes possible to supply fuel into the fuel tank 17 by means of the supply port 87.

The fuel tank 17 is composed of upper and lower half tank housings 17a, 17b, defined by means of a horizontal division disposed near its upper surface and connected together by means of a suitable welding process particularly, for example, seam welding, through means of flanges 90 providing contact surfaces therebetween. In this case, the upper half tank housing 17a has generally a shallow configuration, while the lower half tank housing 17b has such a configuration as having a deep front half portion.

The upper half tank housing 17a has a front half portion which narrows toward its leading end so as to conform to the aforementioned configuration of the seat rails 5 which likewise narrow toward their leading ends. The lower half tank housing 17b is not narrowed, and accordingly the upper and lower half tank housings 17a, 17b are connected together through means of the flanges 90 which therefore provide a border upon both sides of which there are provided stepped portions.

The upper half tank housing 17b is placed so as to be interposed between the seat rails 5 with the front half portion of upper surface of the flange 90 being kept in contact with the lower surfaces of the seat rails 5. The rear end portion thereof is extended rearwardly beyond the rear end of the seat 16 so as to be disposed at the highest level and is provided at its upper surface with the fuel supply port 87. The openable and closable lid 89 is provided within the rear end surfaces of the body covers 19 and is opened when fuel is to be supplied into the fuel tank 17.

The lower bottom portion of the front half of the fuel tank is the lowest portion of the fuel tank, to which a fuel supply cock 91 is connected.

In this manner, since the fuel tank 17 has its upper surface portion inserted between the seat rails 5 so as to be near the seat bottom plate, it makes use of the dead space created thereby. In addition, the front half portion is able to effectively be as large as possible in its vertical extent or depth as well as its lateral width, and this portion can therefore provide the fuel tank with its large capacity.

Since the fuel tank is composed of the upper and lower, two separate portions connected together by means of the seam welding, a complicated configuration can be attained, the formation of the stepped portion also becomes easy, the and fuel supply or filling operation is facilitated. Accordingly, the fuel tank maintains conventional functions and is effective for permitting a storage container box to be disposed within the central upper portion of the body of the motorcycle.

The fuel cock 91 is attached to the lower bottom portion of the fuel tank 17 at the front end thereof and disposed toward the right side of the motorcycle with respect to a rider sitting upon the seat 16. Since it is disposed at such a low position and is near the transmission chain 14, it is important to eliminate any inteference therewith.

A fuel pump 92 is disposed upon the body tube 6 on the left side of the motorcycle. It is protected by means of the body cover 19 and is disposed upon the left side of the motorcycle which is the same side upon which the motorcycle side stand 93 is disposed. Consequently, if the motorcycle should fall over while the same is parked, the motorcycle is therefore more likely to fail toward the right side, whereby the fuel pump 92 having a comparatively elaborate and expensive construction can be prevented from being damaged and broken by means of the shock or impact of the weight of the motorcycle when the same falls over.

Figure 17:
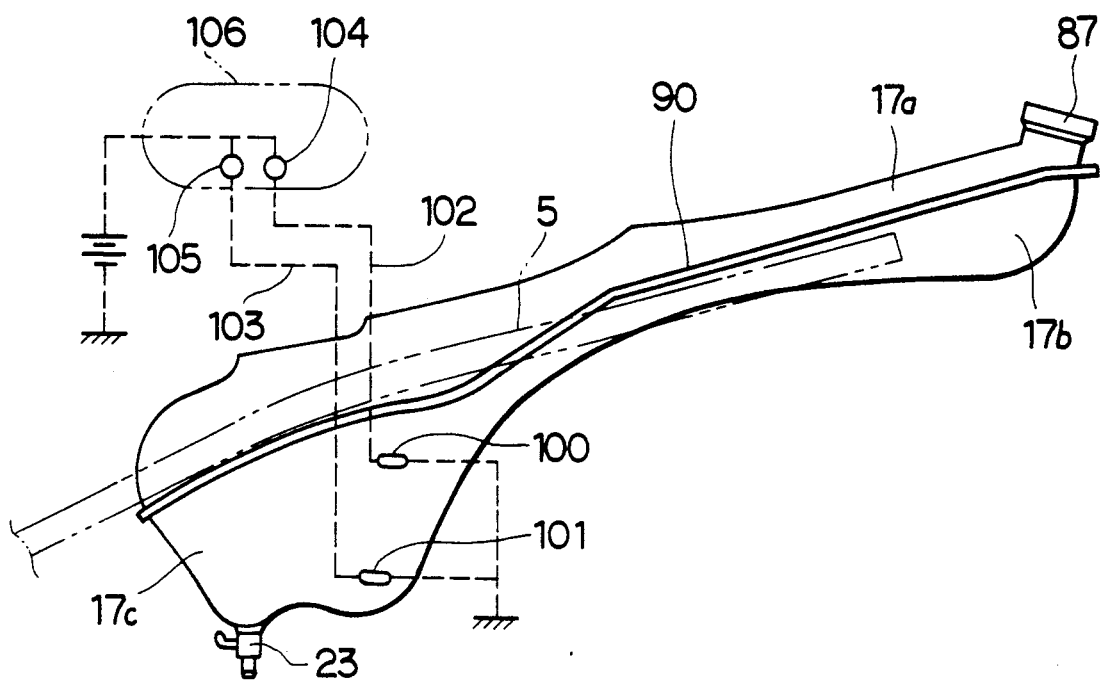
FIG. 17 is an enlarged side view of the fuel tank provided with associated elements.

Furthermore, as can be additionally appreciated from FIG. 17, the front end portion 17c of the fuel tank has a capacity which is not less than or is at least equal to one half of the whole capacity of the fuel tank 17. At an intermediate liquid level defined within this portion of the fuel tank, there is provided an intermediate thermistor element 100, and at the reserve liquid level, where there remains a reserve amount of fuel enabling the motorcycle to travel for several additional tens of Km, there is provided a reserve thermistor element 101.

Both thermistor elements 100, 101 are called liquid level sensors and have the characteristic of generating an heat when an electricity is supplied thereto and of decreasing the value of its resistance when its temperature rises. When it is disposed within the fuel, since the heat is absorbed by means of the fuel because the heat transfer coefficient of the fuel is large, the resistance value is maintained large. When it is disposed within the air, that is, when the fuel supply is almost depleted, since the heat transfer coefficient of the air is small, the temperature of the sensor rises as a result of its heat generation and its resistance value becomes small. By making use of the difference between the resistance values of the sensors within the fuel and within the air, the illumination and the extinguishment of the fuel indication lamp is directly and indirectly controlled.

An intermediate indication lamp 104 is connected in series within an electric power source circuit 102 of connected to the intermediate thermistor element 100, and a reserve indication lamp 105 is connected in series within an electric power source circuit 103 connected to the reserve thermistor element 24. Both indication lamps 104, 105 are arranged side by side within an instrument panel 106 mounted upon the handle bar assembly 8.

When the fuel decreases to the intermediate liquid level, the intermediate thermistor element 100 is exposed to the air and the intermediate indication lamp 104 is illuminated. The illumination of the intermediate indication lamp 104 continues until the fuel tank is refilled. If the fuel continues to be progressively consumed such that the fuel level is decreased to the reserve liquid level, the reserve thermistor 101 is exposed to the air and the reserve indication lamp 105 is illuminated.

In this manner, the rider can recognize the intermediate liquid level of the storage fuel by means of the illumination of the intermediate indication lamp 105 and plan the operating or traveling schedule of the motorcycle accordingly. When the reserve indication lamp 105 is illuminated, the rider can correctly deal with the situation, that is, take immediate measures to refill the fuel tank.

In the case that the indication lamps 104, 105 are provided with differint levels of illumination brightness or different colors, the discrimination therebetween can be effectively achieved.

Incidentally, in the case that two or more intermediate thermistor elements are arranged and the intermediate indication lamps adapted to be controlled thereby are correspondingly arranged side by side, the intermediate liquid level can be recognized more correctly.

A reservoir tank for the brake oil is disposed upon the seat rail 5 upon the side opposite the fuel pump 92.

Incidentally, the lower surface of the bottom plate 21 of the storage container box 15 is covered with a heat insulating board 95. Since it is located just above the engine unit 7, heat radiated from the engine unit 7 can be effectively deflected so as to protect the stored commodity from heat damage. In the case that an additional lustrous or reflective film 96 such as, for example, aluminum foil is secured to the lower surface of the heat insulating board 95, the heat insulation effect can be enhanced.

In accordance with the foregoing, by swinging the storage box 15 backwardly and upwardly so as to open or expose the region disposed above the engine unit 7, it becomes easy to carry out the maintenance operations and the inspections of the respective portions of the engine and the auxiliary components thereof. The maintenance operation therefore become easy to perform, such as, for example, the adjustment of the carburetor 46, the replacement of the filter for the air cleaner 47, and the supply or replenishment of the battery liquid for the battery 48 disposed adjacent thereto.

Since the storage box 15 can be correctly positioned by merely lowering the same after completion of the maintenance operations, it is unnecessary to adjust it every time a maintenance operation is to be performed and the attachment bracket 30 at the front end thereof can be readily secured to the upper main tubes 2a, so that the attachment or mounting operation can also be facilitated.

Since the posture of the storage box 15 when the same is opened backwardly and upwardly is maintained in a stable and upright position upon the seat rails 5 during performance of the maintenance operations, undivided attention can be given to the maintenance operations without using one's hands for supporting the storage box in its opened positioned.

Furthermore, since the storage box 15 during normal operation of the motorcycle is pressed downwardly by means of the seat 16 to which the seat lock is applied so as not to be swung upwardly even though the attachment bracket 30 at the front end thereof is disassembled, it is possible to prevent theft of the stored commodity even after disassembly of the hinge mechanism 28.

It should be understood that the present invention is not limited to the described embodiments and many other changes and modifications may be made without departing the spirit of the appended claims. It is therefore to be understood that within the scope of the appended claims, the present invention may be practiced otherwise than as specifically described herein.

What is claimed is:

1. A storage box container, for a motorcycle having an engine unit disposed at a substantially central portion of a motorcycle body and below a main tube extending rearwardly from a head pipe, and additionally including a seat detachably mounted upon a seat rail extending rearwardly from a rear end of said main tube, said storage box container being disposed at a substantially upper central portion of said body frame of said motorcycle and comprising:

a storage box body having an opening defined within an upper surface portion thereof, a rear portion thereof supported upon said seat rail by means of a first hinge means such that said storage box body is pivotably movable between a first lowered position and a second raised position, and a front portion thereof adapted to be secured to said main tube when said storage box body is disposed at said first lowered position;

a lid member mounted upon said storage box body by means of a second hinge means such that said lid member is pivotably movable between a first lowered position for closing said opening of said storage box body and a second raised position for uncovering said opening of said storage box body so as to permit an article to be inserted into or removed from said storage box body;

a first lock means mounted upon said storage box body for locking said lid member at said first lowered position;

a second lock means for securing said seat upon said seat rail; and said rear portion of said storage box body being overlapped by means of a front end portion of said seat when said seat is secured to said seat rail by said second lock means such that said storage box body is prevented from being pivotably moved from said first lowered position to said second raised position when said seat is secured to said seat rail by said second lock means.

2. A storage box container according to claim 1, wherein said first hinge means is disposed at the rear end portion of said storage box body and said storage box body is pivotable upwardly to said second raised position rearward of said first hinge means so as to substantially have an upright attitude with respect to said seat rail when said seat is removed.

3. A storage box container according to claim 2, wherein the rear portion of said storage box body has a recessed portion into which the front end of said seat is engaged when the seat is secured to said seat rail.

4. A storage box container according to claim 1, wherein said storage box body is made of a resin material.

5. A storage box container according to claim 1, wherein said storage box body is composed of bilaterally dividable two halves.

6. A storage box apparatus according to claim 1, wherein said first hinge means is disposed at an outer rear end portion of said storage box body, said second hinge means is disposed at an inner front end portion of said storage box body, and said first lock means is disposed at an inner rear end portion of said storage box body.

7. A storage box apparatus according to claim 1, wherein said storage box body is provided with a front portion recessed inwardly to form a space between the storage box body and the body frame for accommodating a battery of said motorcycle.

8. A storage box container, for a motorcycle having an engine unit disposed at a substantially central portion of a motocycle body and below a main tube extending rearwardly from a head pipe, and additionally having a seat detachably mounted upon a seat rail extending rearwardly from a rear end of said main tube, said storage box container being disposed at a substantially upper central portion of said body frame of said motorcycle and comprising:

a storage box body having an opening defined within an upper surface portion thereof, and a rear portion supported upon said seat rail by means of a first hinge means such that said storage box body is pivotably movable between a first lowered position and a second raised position;

a lid member mounted upon said storage box body by means of a second hinge means such that said lid member is pivotably movable between a first lowered position for closing said opening of said storage box body and a second raised position for uncovering said opening of said storage box body so as to permit an article to be inserted into or removed from said storage box body; and a lock means mounted upon said storage box body for locking said lid member at said first lowered position;

said storage box body having a front end portion to which a front plate having a front portion extending forwardly from said front end portion of said storage box body is secured, said front portion of said front plate being provided with a cut-out portion, said front plate being adapted to be secured to an upper surface portion of a front end of said main tube disposed close to a connecting portion defined between said main tube and said head pipe so that said cut-out portion of said front plate surrounds a rear surface portion of said head pipe when said storage box body is disposed at said first lowered position.

9. A storage box container according to claim 8, wherein said cut-out portion has a substantially semicircular shape so as to conceal a welding portion defined between the head pipe and the main tube.

10. A storage box container according to claim 8, wherein said storage box body is made of a resin material.

11. A storage box container according to claim 8, wherein said storage box body is composed of bilaterally dividable two halves.

12. A storage box apparatus according to claim 8, wherein said first hinge means is disposed at an outer rear end portion of said storage box body, said second hinge means is disposed at an inner front end portion of said storage box body, and said lock means is disposed at an inner rear end portion of said storage box body.

13. A storage box apparatus according to claim 8, wherein said storage box body is provided with a front portion recessed inwardly to form a space between the storage box body and the body frame for accomodating a battery for said motorcycle.

14. A storage box container as set forth in claim 1, wherein:
said storage box body is disposed above said engine unit of said motorcycle such that when said storage box body is disposed at said first lowered position, said storage box body covers said engine unit, whereas when said storage box body is disposed at said second raised position, said storage box body uncovers said engine unit so as to provide access to said engine unit in order to facilitate maintenance operations to be performed upon said engine unit.

15. A storage box container as set forth in claim 1, wherein:
said first lock means comprises solenoid release means operatively connected with an engine starting circuit of said motorcycle.

16. A storage box container as set forth in claim 8, wherein:
said first hinge means is disposed upon a rear end portion of said storage box body, and said storage box body is pivotable upwardly to said second raised position disposed rearwardly of said first hinge means so as to have a substantially upright attitude with respect to said seal rail when said storage box body is disposed at said second raised position.

17. A storage box container as set forth in claim 8, further comprising:
second lock means for securing said seat upon said seat rail,
said rear portion of said storage box body being overlapped by means of a front end portion of said seat when said seat is secured to said seat rail by said second lock means such that said storage box body is prevented from being pivotably moved from said first lowered position to said second raised position when said seat is secured to said seat rail by said second lock means.

18. A storage box container as set forth in claim 17, wherein:
said rear portion of said storage box body is provided with a recessed portion into which the front end of said seat is engaged when said seat is secured to said seat rail by said second lock means.

19. A storage box container as set forth in claim 8, wherein:
said storage box body is disposed above said engine unit of said motorcycle such that when said storage box body is disposed at said first lowered position, said storage box body covers said engine unit, whereas when said storage box body is disposed at said second raised position, said storage box body uncovers said engine unit so as to provide access to said engine unit in order to facilitate maintenance operations to be performed upon said engine unit.

20. A storage box container as set forth in claim 8, wherein:
said lock means comprises solenoid release means operatively connected with an engine starting circuit of said motorcycle.

* * * * *

UNITED STATES PATENT AND TRADEMARK OFFICE
CERTIFICATE OF CORRECTION

PATENT NO.  : 5,147,077
DATED       : September 15, 1992
INVENTOR(S) : SHINJI NAKAJIMA It is certified that error appears in the above-identified patent and that said Letters Patent is hereby corrected as shown below:

Claim 16, column 15, line 38, change "seal" to --seat--.

In the Abstract, line 16, delete "body is."

Signed and Sealed this

Twenty-eighth Day of September, 1993

Attest:

BRUCE LEHMAN

*Attesting Officer*  *Commissioner of Patents and Trademarks*